US011276012B2

(12) United States Patent
Dong et al.

(10) Patent No.: US 11,276,012 B2
(45) Date of Patent: Mar. 15, 2022

(54) ROUTE PREDICTION BASED ON ADAPTIVE HYBRID MODEL

(71) Applicant: International Business Machines Corporation, Armonk, NY (US)

(72) Inventors: Wei Shan Dong, Beijing (CN); Ning Duan, Shanghai (CN); Guoqiang Hu, Beijing (CN); Zhi Hu Wang, Beijing (CN); Ting Yuan, Beijing (CN); Jun Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 543 days.

(21) Appl. No.: 15/485,692

(22) Filed: Apr. 12, 2017

(65) Prior Publication Data
US 2018/0300641 A1    Oct. 18, 2018

(51) Int. Cl.
| | | |
|---|---|---|
| *G06N 20/00* | (2019.01) | |
| *G06N 3/04* | (2006.01) | |
| *G01C 21/34* | (2006.01) | |
| *G06N 7/00* | (2006.01) | |
| *G06N 3/08* | (2006.01) | |
| *G01C 21/00* | (2006.01) | |

(52) U.S. Cl.
CPC .............. *G06N 20/00* (2019.01); *G01C 21/00* (2013.01); *G01C 21/3484* (2013.01); *G06N 3/0445* (2013.01); *G06N 3/08* (2013.01); *G06N 7/005* (2013.01)

(58) Field of Classification Search
CPC ........ G06N 20/00; G06N 7/005; G06N 5/047; G06N 3/04; G06N 3/08; G01C 21/34
See application file for complete search history.

(56) References Cited

U.S. PATENT DOCUMENTS

| 8,024,112 B2 | 9/2011 | Krumm et al. | |
|---|---|---|---|
| 2014/0136104 A1* | 5/2014 | Spears ............... | G01C 21/3484 701/521 |

(Continued)

FOREIGN PATENT DOCUMENTS

WO    WO 2011/117242 A1    9/2011

OTHER PUBLICATIONS

Alexandre Alahi, Kratarth Goel, Vignesh Ramanathan, Alexandre Robicquet, Li Fei-Fei, Silvio Savarese, "Social LSTM: Human Trajectory Prediction in Crowded Spaces", IEEE Conference on CVPR (2016), pp. 961-971 (Year: 2016).*

(Continued)

*Primary Examiner* — Kamran Afshar
*Assistant Examiner* — Randall K. Baldwin
(74) *Attorney, Agent, or Firm* — Joseph Petrokaitis, Esq.; MGinn I.P. Law Group, PLLC.

(57) ABSTRACT

A method, system, and computer program product for obtaining a first route traversed by a target object, performing at least one prediction for a second route to be traversed by the target object based on the first route, the at least one prediction being performed with at least one of an object-specific prediction model, an object group-specific prediction model, and an object-independent prediction model, and determining, according to a decision rule, a prediction result of the second route based on the at least one prediction.

20 Claims, 9 Drawing Sheets

(56) References Cited

U.S. PATENT DOCUMENTS

| | | | | |
|---|---|---|---|---|
| 2014/0278051 | A1* | 9/2014 | McGavran | G06N 20/00 |
| | | | | 701/400 |
| 2015/0354978 | A1* | 12/2015 | Gerlach | G06N 7/005 |
| | | | | 701/424 |
| 2016/0360336 | A1* | 12/2016 | Gross | H04M 1/72583 |

OTHER PUBLICATIONS

Loukas Dimitriou, Theodore Tsekeris, Antony Stathopoulos, "Adaptive hybrid fuzzy rule-based system approach for modeling and predicting urban traffic flow", Transportation Research Part C 16 (2008), pp. 554-573 (Year: 2008).*

Hori, Chiori, Shinji Watanabe, Takaaki Hori, Bret A. Harsham, JohnR Hershey, Yusuke Koji, Yoichi Fujii, and Yuki Furumoto. "Driver confusion status detection using recurrent neural networks." In 2016 IEEE International Conference on Multimedia and Expo (ICME), pp. 1-6. IEEE, 2016 (Year: 2016).*

Sun, Wei, et al. "Moving object map analytics: A framework enabling contextual spatial-temporal analytics of Internet of Things applications." 2016 IEEE International Conference on Service Operations and Logistics, and Informatics (SOLI). IEEE, 2016. (Year: 2016).*

Mel, et al. "The NIST Definition of Cloud Computing". Recommendations of the National Institute of Standards and Technology. Nov. 16, 2015.

Ling Chen, et al. "A System For Destination And Future Route Prediction Based On Trajectory Mining" Journal Pervasive and Mobile Computing archive vol. 6 Issue 6, Dec. 2010. pp. 657-676.

Hoyoung Jeung "A Hybrid Prediction Model For Moving Objects" 2008 IEEE 24th International Conference on Data Engineering, Apr. 7-12, 2008.

Shaojie Qiao, et al. "A self-adaptive parameter selection trajectory prediction approach via hidden markov models" IEEE Transactions on Intelligent Transportation Systems (vol. 16, Issue: 1), Oct. 8, 2014.

Guangtao Xue "Traffic-known urban vehicular route prediction based on partial mobility patterns" Parallel and Distributed Systems (ICPADS), 2009 15th International Conference on Dec. 8-11, 2009.

Jon Froehlich, et al. "Route prediction from trip observations" 2008 SAE international.

* cited by examiner

ROUTE PREDICTION BASED ON ADAPTIVE HYBRID MODEL

BACKGROUND

The present invention generally relates to route prediction, and more specifically, to route prediction based on an adaptive hybrid model.

It is often required to predict routes of moving objects such as vehicles. Given a partial route of a current ongoing trajectory of a target object, a route prediction model can estimate a route in the near future and/or the destination of the target object. Most of route prediction models are near-real-time enabling services for driving assistance. For example, they may provide targeted notification of dynamic road/traffic condition information, route recommendation, and assistance information at destination like parking place availability, shopping mall coupons, etc.

There are various existing route prediction models. Some route prediction models may be based on history route data of the target object and/or a group of objects. The examples are prediction models based on pattern learning and pattern matching, prediction models based on Markov models, prediction models based on Bayesian Inference, and prediction models based on neural networks. Other route prediction models may be based on road networks, for example, prediction models based on road networks. However, these existing prediction models may not achieve satisfactory performance in various possible prediction situations.

SUMMARY

In an exemplary embodiment, the present invention can provide obtaining a first route traversed by a target object, performing at least one prediction for a second route to be traversed by the target object based on the first route, the at least one prediction being performed with at least one of an object-specific prediction model, an object group-specific prediction model, and an object-independent prediction model, and determining, according to a decision rule, a prediction result of the second route based on the at least one prediction. One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
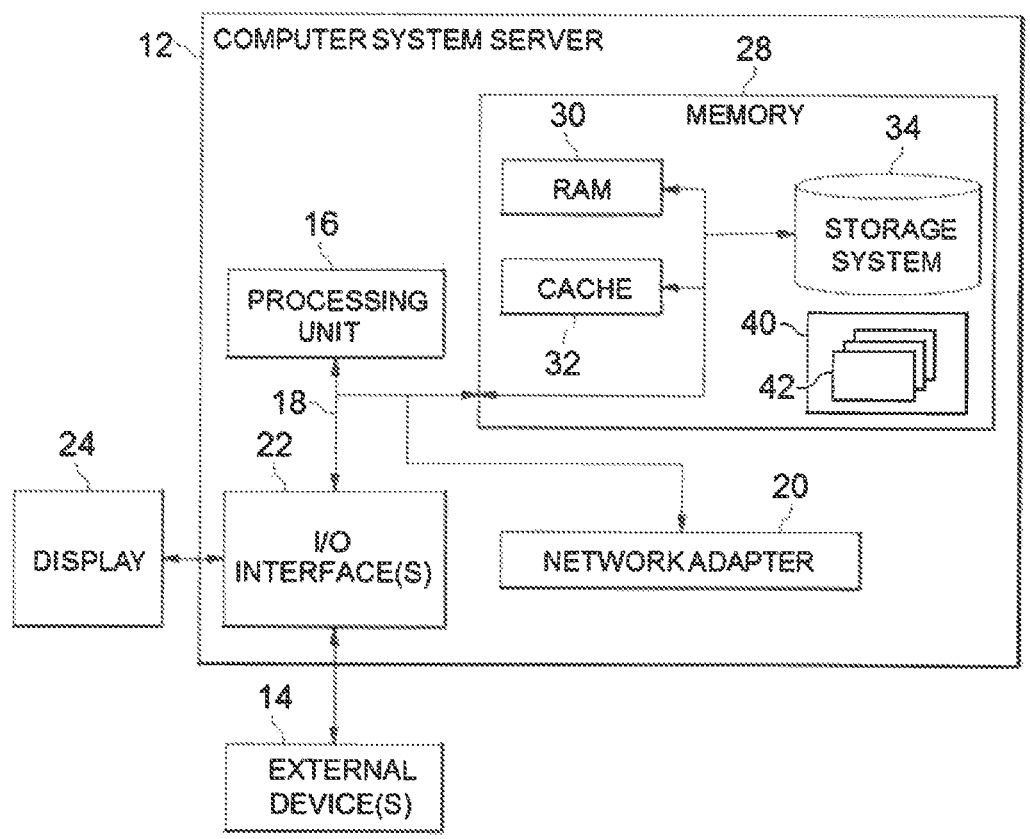
FIG. 1 depicts a cloud-computing node 10 according to an embodiment of the present invention.

The invention will now be described with reference to FIGS. 1-11, in which like reference numerals refer to like parts throughout. It is emphasized that, according to common practice, the various features of the drawings are not necessarily to scale. On the contrary, the dimensions of the various features can be arbitrarily expanded or reduced for clarity.

Figure 2:
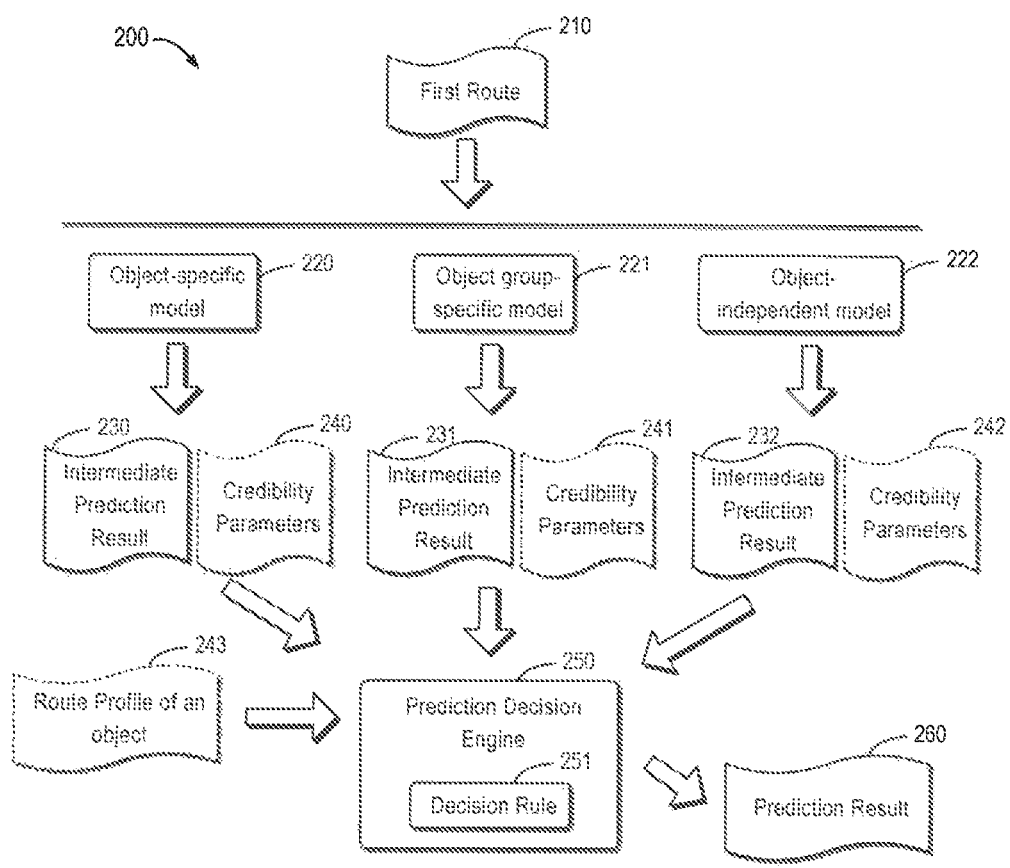
FIG. 2 shows a conceptual diagram illustrating the adaptive hybrid model for route prediction according to embodiments of the present disclosure.

By way of introduction of the example depicted in FIG. 2, one or more computers of a computer system 12 according to an embodiment of the present invention can include a memory 28 having instructions stored in a storage system to perform the steps of FIG. 1.

Although one or more embodiments may be implemented in a cloud environment 50 (see e.g., FIG. 10), it is nonetheless understood that the present invention can be implemented outside of the cloud environment.

As mentioned in the background section, there are various existing route prediction models for route prediction. However, these prediction models may not achieve satisfactory performance in various possible prediction situations. The reason is that they have different properties in different aspects and are only suitable for particular ones of possible prediction situations. The following Table I shows a comparison among three different typical prediction models, that is, the pattern mining model, the deep learning model and the route efficiency computation model.

TABLE 1

|  | Pattern Mining | Deep Learning | Route Efficiency Computation |
|---|---|---|---|
| Prediction output | Destination + route | Future route in a prediction horizon | Future route in a prediction horizon |
| Dependency | Flexible, ranging | Fixed window | The whole partial |

TABLE 1-continued

|  | Pattern Mining | Deep Learning | Route Efficiency Computation |
|---|---|---|---|
| window of partial route | from the current location only up to the whole partial route | size | route |
| Accuracy | High accuracy in case of good matching of known patterns | Ability to infer routes based on different history routes | Reasonable prediction even in case of no history data |
| Training data requirement | Relatively small amount of data | Large amount of data required | No history data required |
| Model training time | Short or medium | long | 0 |
| Prediction time | Medium or long, proportional to the number of patterns | short | short |

It can be seen that the pattern mining model is quite accurate for routine trajectories, easy to train and suitable for using as an object-specific prediction model. The deep learning model has capability to learn potential routes from trajectories of different objects and is suitable for using as an object group-specific prediction model. The route efficiency computation model is based mainly on a road network, does not need history data from objects, and thus is suitable for using as an object-independent prediction model.

As used herein, the object-specific prediction model refers to a prediction model mainly based on history data from a particular object. The object group-specific prediction model refers to a prediction model mainly based on history data from a group of objects. The objects in the group may share some common characteristics. For example, they may have a similar starting point and a destination. As another example, they may have a common partial route. As a further example, they may be all the target objects of the adaptive hybrid model according to embodiments of the present disclosure. The object-independent prediction model refers to a prediction model that is not based on history data from an object. This object-independent type model is typically based on road networks, which may recommend routes for an object according to the ground truth, current traffic, and other object-independent information, etc.

It should be understood that although the pattern mining model, the deep learning model and the route efficiency computation model are taken as examples for the object-specific prediction model, the object group-specific prediction model and the object-independent prediction model, respectively, the three types of prediction model may employ other existing prediction models as well, including, but not limited to, a prediction model based on Markov models, a prediction model based on Bayesian Inference, a prediction model based on neural networks, and/or other prediction models.

In conventional route prediction solutions, a prediction model of a single type from the object-specific type, the object group-specific type and the object-independent type is employed and this prediction model of the single type cannot achieve satisfactory performance in all prediction situations. For example, the object-specific prediction model gives high prediction accuracy when the current trajectory of a target object well follows a history pattern of the target object, but is not good at inferring a route if the current target object never tries it before. The object group-specific prediction model is on the contrary. As another example, if there is no available history data from any object, neither the object-specific prediction model nor the object group-specific prediction model can provide a good prediction result. In this event, the object-independent prediction model is better than the object-specific prediction model and the object group-specific prediction model.

In order to solve the above and other potential problems, embodiments of the present disclosure provide an adaptive hybrid model 200 for route prediction, the mechanism of which is illustrated in a conceptual diagram as shown in FIG. 2. In the adaptive hybrid model 200, a first route 210 traversed by a target object may be input to an object-specific prediction model 220, an object group-specific prediction model 221 and an object-independent prediction model 222 employed by the adaptive hybrid model 200.

Based on the first route 210, the object-specific prediction model 220, the object group-specific prediction model 221 and the object-independent prediction model 222 may provide respective predictions, particularly respective intermediate prediction results 230, 231 and 232, for a second route to be traversed by the target object. The intermediate prediction results 230, 231 and 232 are in turn input to a prediction decision engine 250. The prediction decision engine 250 may provide a prediction result 260 for the second route, according to a decision rule 251, based on the intermediate prediction results 230, 231 and 232. The decision rule 251 is selected so that the prediction result 260 is determined from the intermediate prediction results 230, 231 and 232 under the consideration of the model performance of a particular prediction model for a specific prediction situation.

In some embodiments, the object-specific prediction model 220, the object group-specific prediction model 221 and the object-independent prediction model 222 may also provide their respective credibility parameters 240, 241 and 242, which may indicate the credibility of the intermediate prediction results 230, 231 and 232. In other words, the credibility parameters 240, 241 and 242 may reflect the model performance of a respective prediction model for a specific prediction situation. In some embodiments, the prediction decision engine 250 may utilize the credibility parameters 240, 241 and 242 as the decision rule 251 for determining the prediction result 260. In other embodiments, the decision rule 251 may also include a route profile 243 of an object. In some embodiments, the route profile 243 may be prior information of a particular object regarding its trajectories. Therefore, the adaptive hybrid model 200 may also consider general characteristics of the trajectories of a particular target object when determining the prediction result 260 for the target object.

It can be seen that, in accordance with embodiments of the present disclosure, the adaptive hybrid model 200 may take advantage of all the three types of prediction models with consideration of the model goodness for the current prediction case. In addition, the adaptive hybrid model 200 can perfectly solve the cold-start problem, i.e., no history data or insufficient history data at the beginning phase of a route prediction platform. Therefore, the adaptive hybrid model 200 may achieve a better performance compared to conventional route prediction models. Some example embodiments will now be described in detail.

Figure 3:
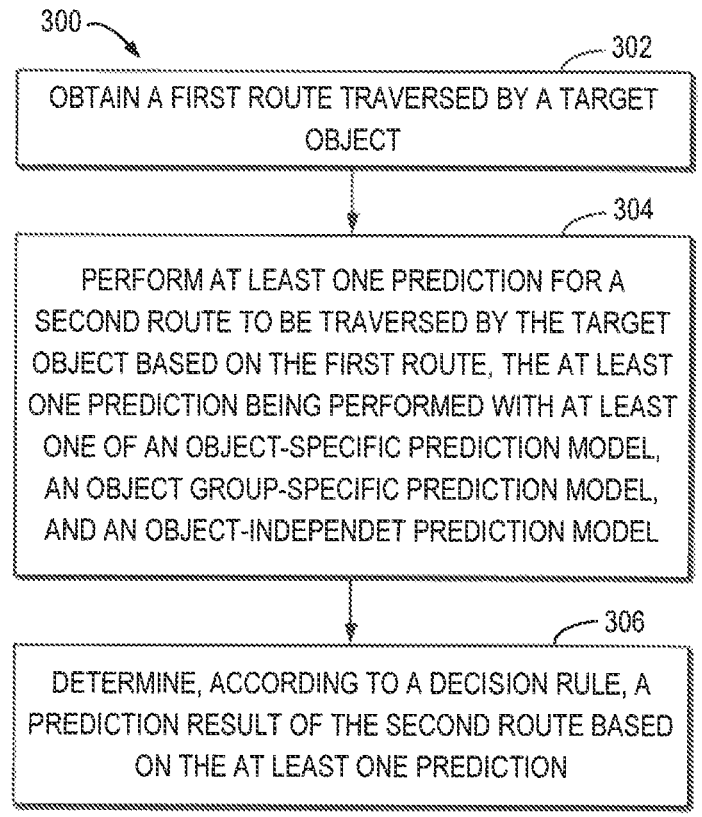
FIG. 3 shows a flowchart of a method for route prediction in accordance with embodiments of the present disclosure.

FIG. 3 shows a flowchart of a method 300 for route prediction in accordance with embodiments of the present disclosure. The method 300 can be implemented by the adaptive hybrid model 200 as shown in FIG. 2, for example. In step 302, the adaptive hybrid model 200 obtains a first route 210 traversed by a target object. As is known in the art, given a route of a current ongoing trajectory of an object, a route prediction model can estimate a route in the near future for the object. Since how to obtain such a route traversed by a target object is well known in the art, it will not be further described in detail herein. The adaptive hybrid model 200 may employ any existing method or manner for obtaining a route traversed by a target object.

In step 304, the adaptive hybrid model 200 performs at least one prediction for a second route to be traversed by the target object based on the first route 210, the at least one prediction being performed with at least one of an object-specific prediction model 220, an object group-specific prediction model 221, and an object-independent prediction model 222. As described above, the object-specific prediction model 220 refers to a prediction model mainly based on history data from a particular object. The object group-specific prediction model 221 refers to a prediction model mainly based on history data from a group of objects. The objects in the group may share some common characteristics. The object-independent prediction model 222 refers to a prediction model that is not based on history data from an object. The specific prediction process of an individual prediction model is known in the art and will not be described in detail herein.

In some embodiments, the object-specific prediction model 220 may include a pattern matching model, the object group-specific prediction model 221 may include a deep learning model, and the object-independent prediction model 222 may include a road network based model, such as the route efficiency computation model. It is to be understood that the pattern mining model, the deep learning model and the route efficiency computation model are merely illustrative examples for the object-specific prediction model 220, the object group-specific prediction model 221 and the object-independent prediction model 222, respectively. A person skilled in thd art may appreciate that these three types of prediction model may include other existing prediction models, such as a prediction model based on Markov models, a prediction model based on Bayesian Inference, a prediction model based on neural networks, and other suitable prediction models in the art.

In step 306, the prediction decision engine 250 of the adaptive hybrid model 200 determines, according to the decision rule 251, the prediction result 260 of the second route based on the at least one prediction. Based on the predictions performed with the object-specific prediction model 220, the object group-specific prediction model 221 and the object-independent prediction model 222, the prediction decision engine 250 of the adaptive hybrid model 200 may determine the prediction result 260 of the second route for the target object, and take advantage of all the three prediction models.

In particular, the prediction decision engine 250 may obtain respective intermediate prediction results 230, 231, and 232 of the at least one prediction. The prediction decision engine 250 may then determine the prediction result 260 from the intermediate prediction results 230, 231, and 232. Further, in order to determine the prediction result 260 from the intermediate prediction results 230, 231, and 232, the prediction decision engine 250 may select one of the intermediate prediction results 230, 231, and 232 as the prediction result 260. Additionally or alternatively, the prediction decision engine 250 may combine two or more of the intermediate prediction results 230, 231, and 232 into the prediction result 260. Other operations for obtaining the prediction result 260 from the intermediate prediction results 230, 231 and 232 are also possible. The present disclosure is not limited to specific examples described herein.

It is noted that this determination of the prediction decision engine 250 is based on the decision rule 251, whereby the prediction result 260 is optimized according to the current prediction context and/or the route profile 243 of the target object. The decision rule 251 may be any suitable rules for determining and optimizing the prediction result 260, and may be different in different prediction scenarios. In some embodiments, the decision rule 251 may be based on the credibility parameters 240, 241, or 242 of the prediction models 220, 221, and 222 and/or the route profile 243 of the target object.

Figures 4A, 4B:
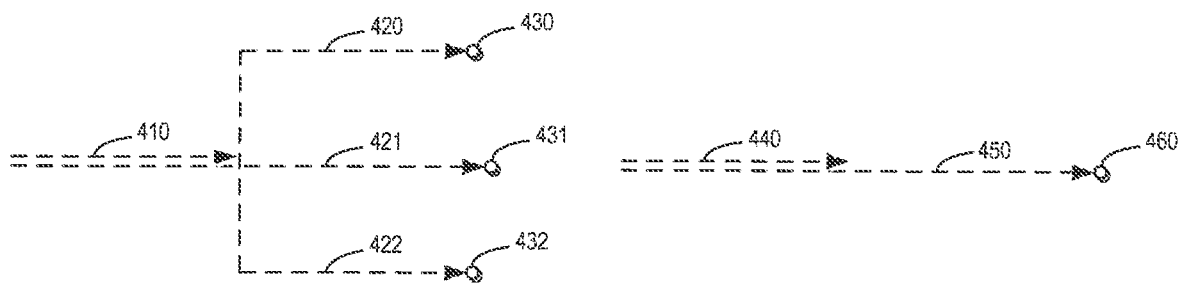
FIGS. 4a and 4b show two examples of a credibility parameter for an object-specific prediction model in accordance with embodiments of the present disclosure.

In some embodiments of the present disclosure, for the object-specific prediction model 220, the credibility parameter 240 may be a history count of the destination or a matching degree of the intermediate prediction result 230. FIGS. 4a and 4b show two examples of the credibility parameter 240 for the object-specific prediction model 220 in accordance with embodiments of the present disclosure.

As shown in FIG. 4a, a route 410 represents the first route traversed by a target object, and routes 420, 421, and 422 represent three possible intermediate prediction results provided by the object-specific prediction model 220. The three possible intermediate prediction results have respective destinations 430, 431, and 432. Assume that the history count of the destination 430 is three, the history count of the destination 431 is four, and the history count of the destination 432 is three, according to the history route data of the target object. In this event, the route 421 with the destination 431 will give a highest credibility parameter 240. Accordingly, object-specific prediction model 220 may determine route 421 as its intermediate prediction result 230.

In contrast, in another example as shown in FIG. 4b, a route 440 represents the first route traversed by a target object, and a route 450 represents the only one possible intermediate prediction result 230 provided by the object-specific prediction model 220. The route 450 has a destination 460. If the history count of the destination 460 is ten according to the history route data of the target object, the credibility parameter 240 of the intermediate prediction result 230 in this example may be ten.

Additionally or alternatively, the credibility parameter 240 of the intermediate prediction result 230 for the object-specific prediction model 220 may be a matching degree of the intermediate prediction result 230. This is illustrated in FIG. 5, which shows another example of the credibility parameter 240 for the object-specific prediction model 220 in accordance with embodiments of the present disclosure.

Figure 5:
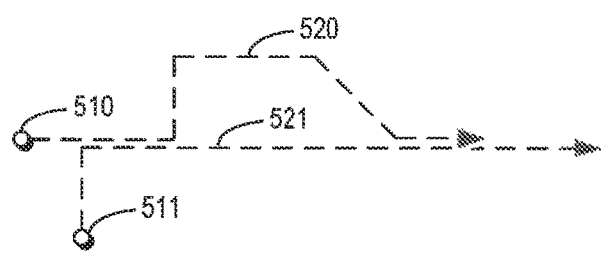
FIG. 5 shows another example of the credibility parameter for the object-specific prediction model in accordance with embodiments of the present disclosure.

As shown in FIG. 5, a route 520 with a starting point 510 is the first route traversed by a target object, and a route 521 with a starting point 511 represents a possible intermediate prediction result 230 provided by the object-specific prediction model 220. It can be seen that the route 520 are partially matched with the route 521, and it is assumed that the matching degree is 50%. In this circumstance, the credibility parameter 240 of the intermediate prediction result 230 may be 50%, if the object-specific prediction model 220 determines the route 521 as the intermediate prediction result 230.

Figure 6:
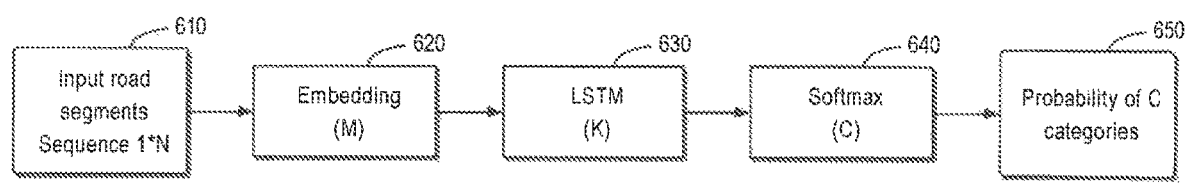
FIG. 6 shows an example of a credibility parameter for an object group-specific prediction model in accordance with embodiments of the present disclosure.

In some embodiments of the present disclosure, for the object group-specific prediction model 221, the credibility parameter 241 may be a prediction probability of the intermediate prediction result 231. FIG. 6 shows an example of the credibility parameter 241 for the object group-specific prediction model 221 in accordance with embodiments of the present disclosure.

As shown in FIG. 6, the credibility parameter 241, in particular, the probability of the intermediate prediction result 231 may be obtained as follows. The input road segments 610, which are represented by a sequence 1*N, e.g., (21, 944, 12, 31, 736, 88), are provided to an embedding block 620 for embedding. The output of the embedding block 620 is provided to a LSTM (Long Short-Term Memory) block 630 for processing. The result of the LSTM block 630 is further provided to a Softmax block 640 for classifying processing to obtain the probabilities of C categories. A person skilled in the art may appreciate that the process as depicted in FIG. 6 is just an example for determining the credibility parameter 241 of the intermediate prediction result 231. Other algorithms or approaches may also be employed in other embodiments.

In some embodiments of the present disclosure, for the object-independent predication model 222, the credibility parameter 242 may be route efficiency of the intermediate prediction result 232, which may be determined according to the road networks, for example. For example, if a route has highest route efficiency according to current conditions of the road networks, the route may be determined as the intermediate prediction result 232 by the object-independent predication model 222. In this case, the credibility parameter 242 of the intermediate prediction result 232 may be an absolute or relative value of the highest route efficiency of this route.

As mentioned above, the decision rule 251 may also be based on the route profile 243 of a target object. The route profile 243 may refer to prior information of a particular object regarding its trajectories. For example, for the particular target object, a route with patterns may have a percentage of 70% and a route without patterns may have a percentage of 30%. In other words, the prediction result 260 determined by the adaptive hybrid model 200 may be different for different target objects, although they may have the same traversed first route.

Figure 7:
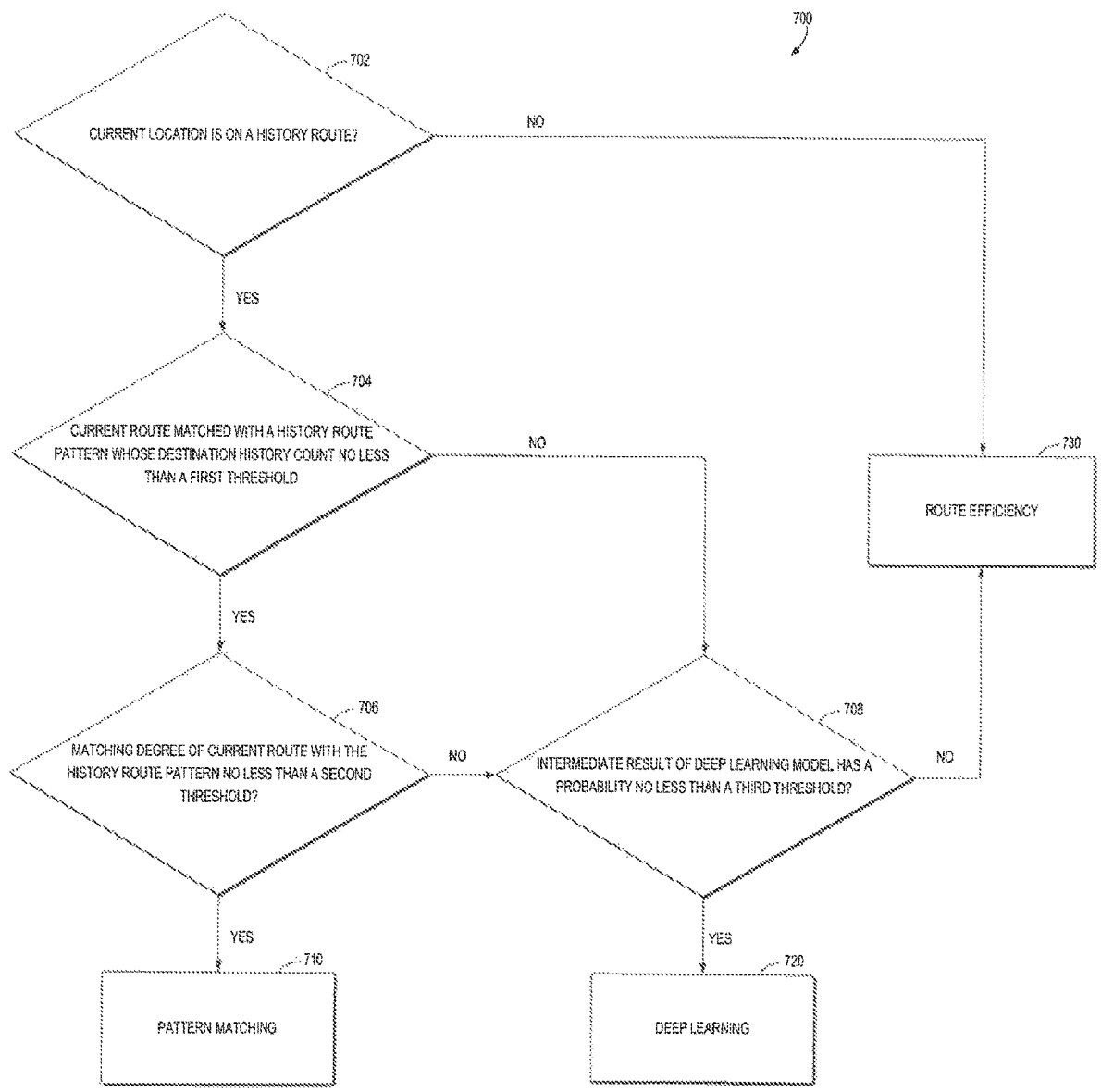
FIG. 7 shows a flowchart of a decision process performed by a prediction decision engine in accordance with embodiments of the present disclosure.

FIG. 7 shows a flowchart of a decision process 700 performed by the prediction decision engine 250 in accordance with embodiments of the present disclosure. In this embodiment shown in FIG. 7, the object-specific prediction model 220, the object group-specific prediction model 221 and the object-independent prediction model 222 are specifically embodied as the pattern matching model, the deep learning model and the route efficiency computation model, respectively. However, the present disclosure is not limited thereto. It will be understood that the decision process 700 is merely an example process that may be performed by the prediction decision engine 250 for determining the prediction result 260. The prediction decision engine 250 may utilize other decision processes different from the decision process 700 in other embodiments.

As shown, in step 702, the prediction decision engine 250 determines whether the current location of a target object is on a history route of the target object. If so, the decision process 700 may proceed to step 704, where the decision engine 250 further determines whether the current route is matched with a history route pattern whose destination having a history count no less than a first threshold. The first threshold may be set according to specific technical environments and design requirements.

If the determination in step 704 is positive, the decision process 700 may proceed to step 706, where the prediction decision engine 250 further determines whether the matching degree of the current route with the history route pattern is no less than a second threshold. The second threshold may be set according to specific technical environments and design requirements.

If the determination in step 706 is positive, the decision process 700 may proceed to step 710, where the prediction decision engine 250 determines the prediction result 260 based on the intermediate prediction result 230 from the pattern matching model. If the determination in step 706 is negative, the decision process 700 may proceed to step 708, where the prediction decision engine 250 further determines whether the intermediate prediction result 231 from the deep learning model has a probability no less than a third threshold. The third threshold may be set according to specific technical environments and design requirements.

If the determination in step 708 is positive, the decision process 700 may proceed to step 720, where the prediction decision engine 250 determines the prediction result 260 based on the intermediate prediction result 231 from the deep learning model. On the other hand, if the determination in step 708 and step 702 is negative, the decision process 700 may proceed to step 730, where the prediction decision engine 250 determines the prediction result 260 based on the intermediate prediction result 232 from the route efficiency computation model.

It is seen that, in this embodiment shown in FIG. 7, the decision rule 251 for the prediction decision engine 250 to determine the prediction result 260 is the criteria set in the blocks 702, 704, 706, and 708. However, it is to be understood that other implementations of the decision rule 251 are possible as well in other embodiments of the present disclosure.

Figure 8:
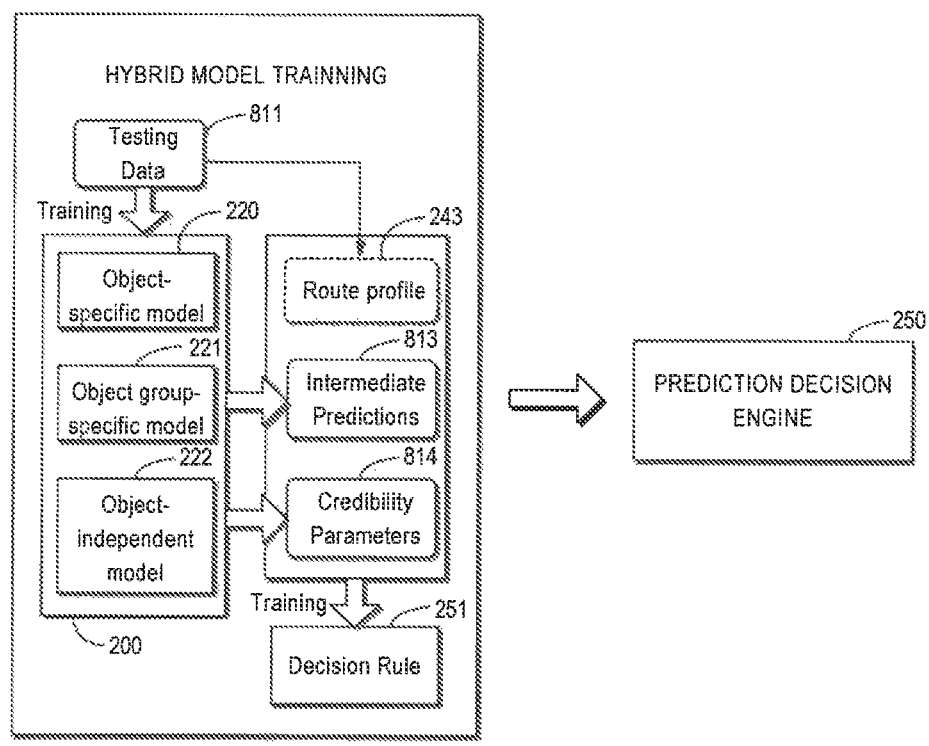
FIG. 8 shows a conceptual diagram illustrating training of the adaptive hybrid model in accordance with embodiments of the present disclosure.

In some embodiments of the present disclosure, the adaptive hybrid model 200 may be trained by using history route data of objects. FIG. 8 shows a conceptual diagram illustrating the training of the adaptive hybrid model 200 in accordance with embodiments of the present disclosure. It is noted that the training can be either offline or online.

As shown in FIG. 8, testing data 811 is input to the adaptive hybrid model 200 which employs the object-specific prediction model 221, the object group-specific prediction model 222 and the object-independent prediction model 223. The testing data 811 may include the history route data of all the target object of the adaptive hybrid model 200. The training of the adaptive hybrid model 200 may include training the object-specific prediction model 221 for a particular target object by using the history route data of the particular target object. The training of the adaptive hybrid model 200 may also include training the object group-specific prediction model 222 for a group of objects by using the history route data of the group. On the other hand, as indicated above, the object-independent prediction model 223 does not need training. In this way, the object-specific prediction model 221 and the object group-specific prediction model 222 may be trained and optimized according to history route data, and thus improving their prediction performance.

As further shown in FIG. 8, when the adaptive hybrid model 200 is being trained, the object-specific prediction model 221, the object group-specific prediction model 222 and the object-independent prediction model 223 may generate their respective intermediate prediction results 230, 231 and 232, which are represented collectively by reference numeral 813, and their respective credibility parameters 240, 241 and 242, which are represented collectively by reference numeral 814. The intermediate prediction results 813, the credibility parameters 814, and the trained decision rule 815 together with the route profile 243 of the particular target object may be provided to the prediction decision engine 250 to determine the prediction result 260. The route profile 243 may be obtained from the testing data 811. As depicted in FIG. 8, the training of the adaptive hybrid model 200 may further include training of the decision rule 251 based on the intermediate prediction results 813, the credibility parameters 814, and the route profile 243, which will be further described with reference to FIG. 9 below.

Figure 9:
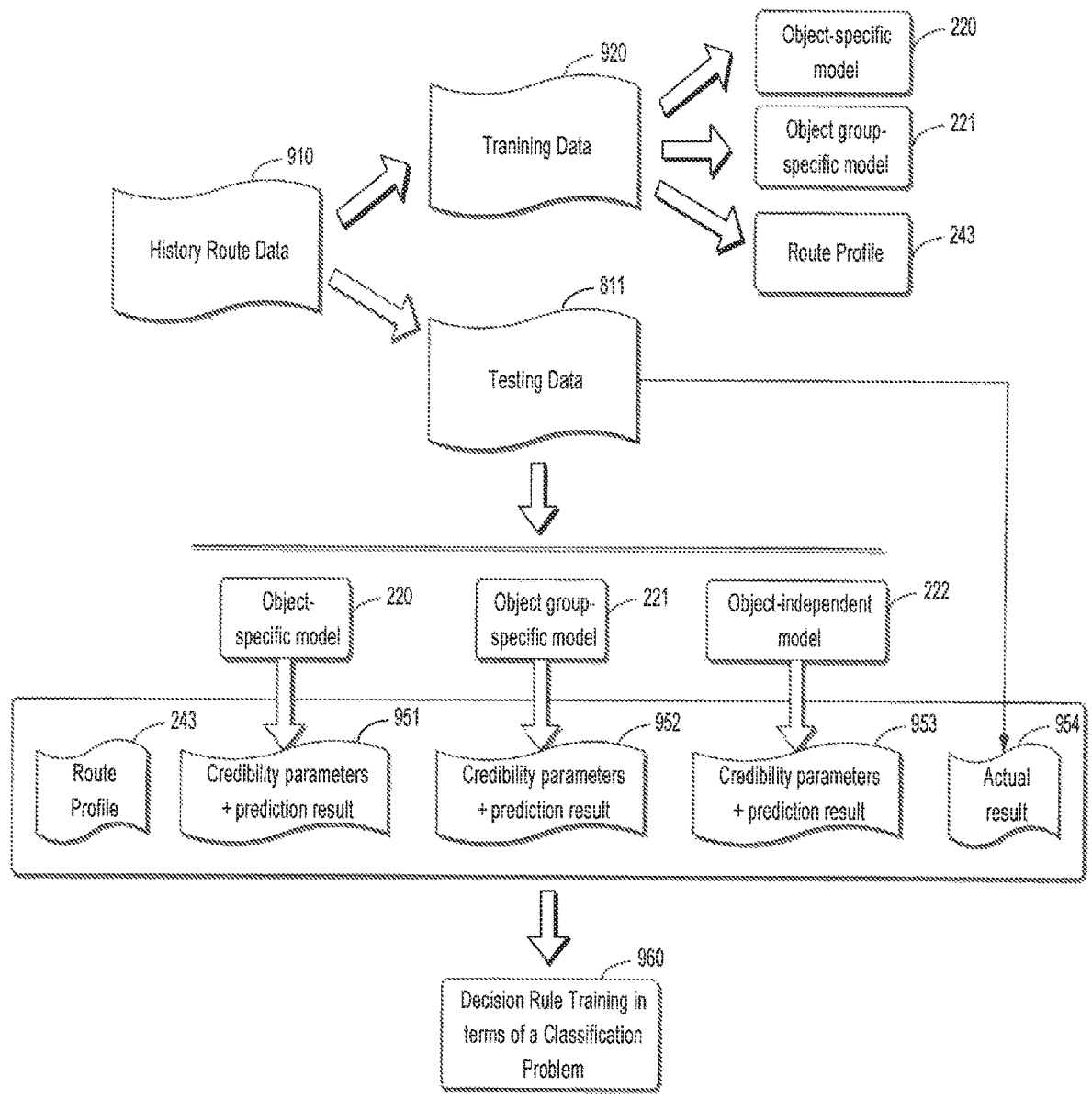
FIG. 9 shows a conceptual diagram illustrating training of a decision rule in accordance with embodiments of the present disclosure.

FIG. 9 shows a conceptual diagram illustrating training of the decision rule 251 in accordance with embodiments of the present disclosure. In this embodiment shown in FIG. 9, history route data 910 from objects may be divided into training data 920 and the testing data 811. The training data 920 is used for training the object-specific prediction model 220 and the object group-specific prediction model 221. This training is similar to that depicted in FIG. 8. In addition, the training data 920 may also be used for obtaining the route profile 243 of respective objects.

The testing data 811 is provided to the trained adaptive hybrid model 200 for testing, and for training the decision rule 251. In particular, the object-specific prediction model 221, the object group-specific prediction model 222 and the object-independent prediction model 223 may generate their respective intermediate prediction results 230, 231 and 232 and their respective credibility parameters 240, 241 and 242, which are represented collectively by reference numerals 951, 952 and 953. On the other hand, an actual result 954 may be obtained from the testing data 811.

With the route profile 243, the intermediate prediction results and credibility parameters 951, 952 and 953, as well as the actual result 954, the decision rule 251 may be trained, for example, in terms of a classification problem. In this way, the decision rule 251 may be trained and optimized so as to enable the prediction decision engine 250 to determine an optimum prediction result 260. However, it is to be understood that training approaches other than the classification approach are also possible in other embodiments.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 1, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 10:
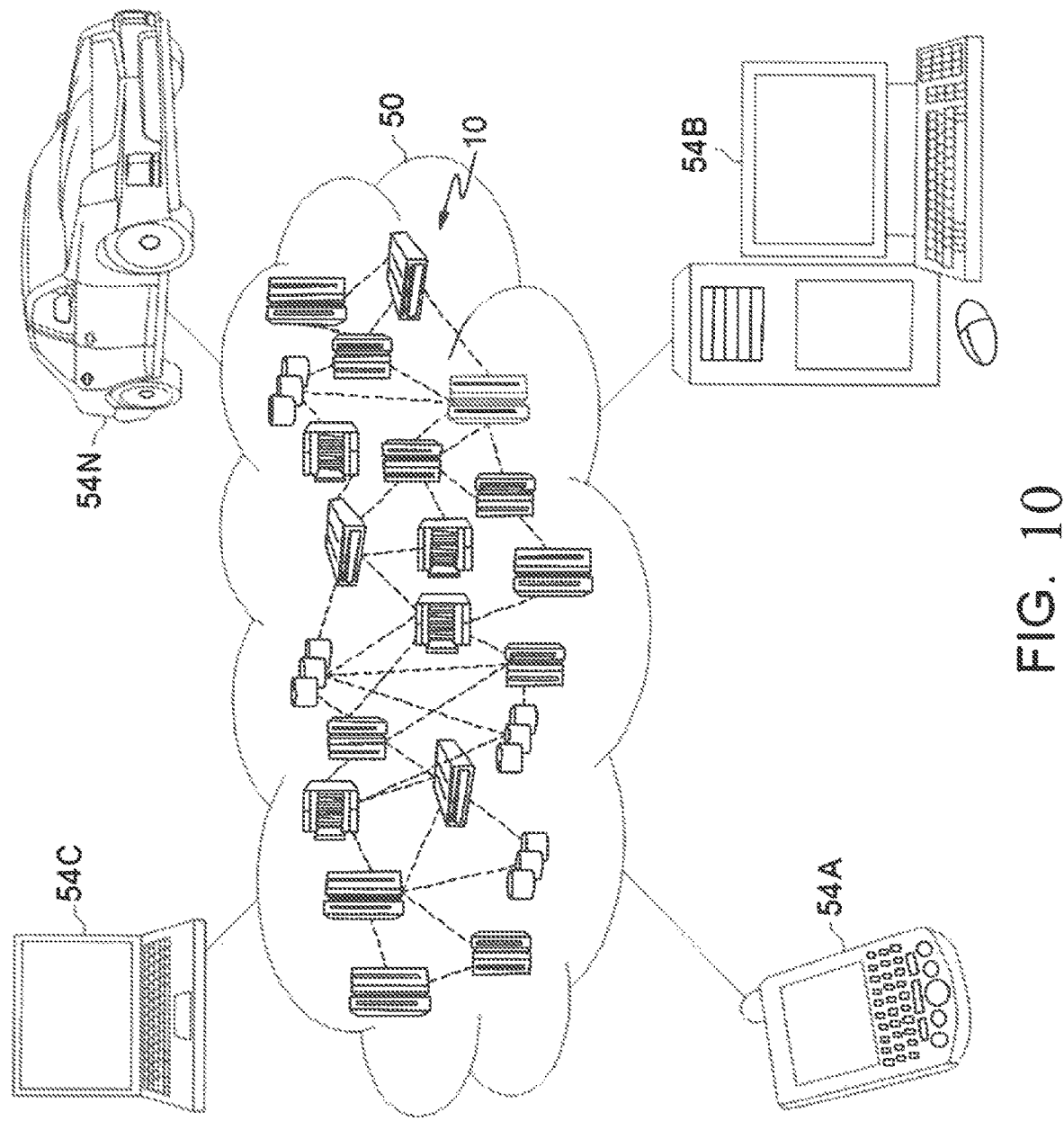
FIG. 10 depicts a cloud-computing environment 50 according to an embodiment of the present invention.

Referring now to FIG. 10, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 10 are intended to be illustrative only and that computing nodes 10 and cloud computing environment 50 can communicate with any type of computerized circuit over any type of network and/or network addressable connection (e.g., using a web browser).

Figure 11:
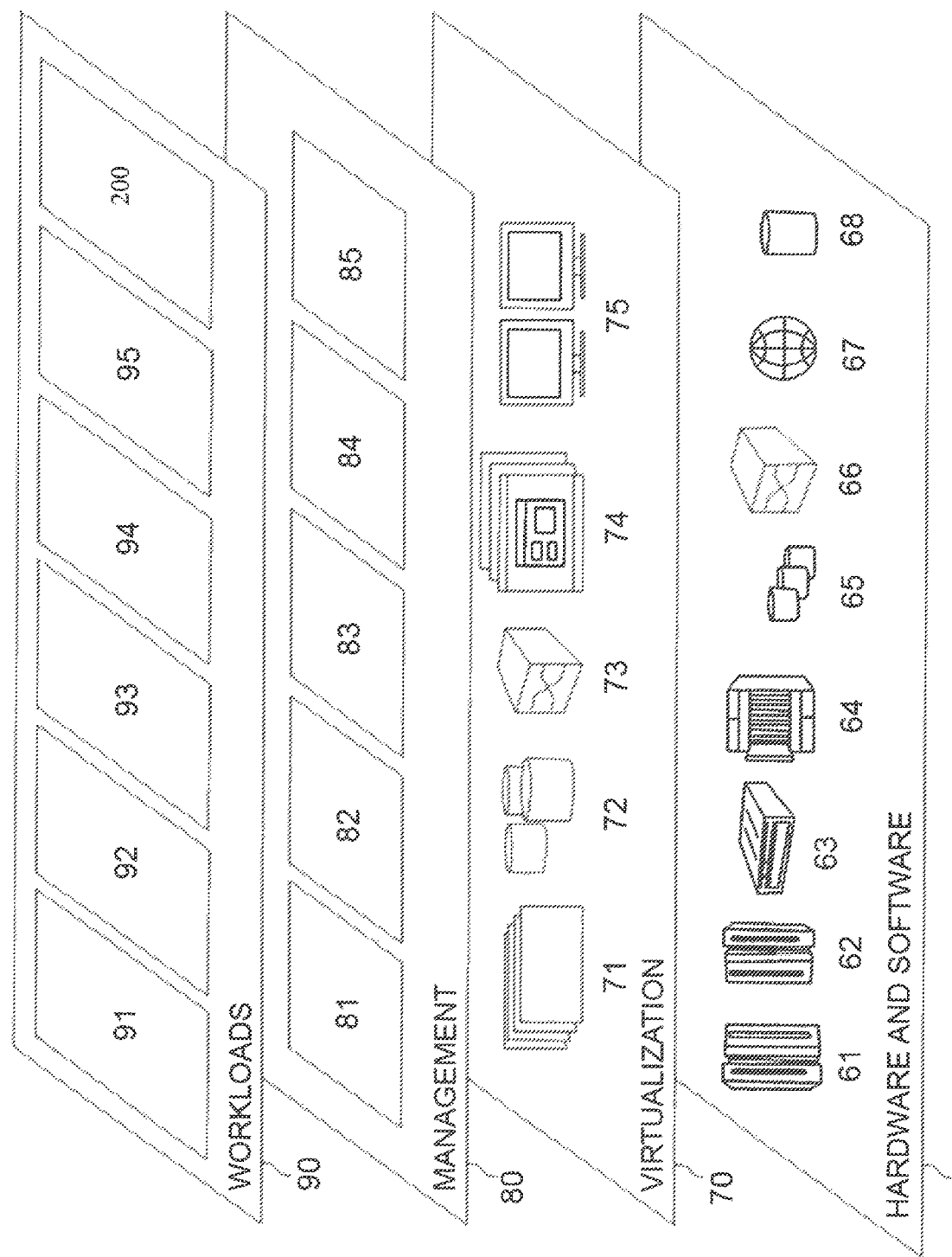
FIG. 11 depicts abstraction model layers according to an embodiment of the present invention.

Referring now to FIG. 11, an exemplary set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and method 200 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of mom specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method, comprising:
    obtaining a first route traversed by a target object;
    training an object-specific prediction model using history route data of the target object;
    performing at least one prediction for a second route to be traversed by the target object based on a hybrid model jointly applying the first route, the at least one prediction being performed with a hybrid consideration using the hybrid model of the object-specific prediction model, an object group-specific prediction model, and an object-independent prediction model; and
    determining, according to a decision rule, a prediction result of the second route based on the at least one prediction,
    wherein the hybrid model completes the prediction when history data is missing or insufficient from a beginning phase of a route prediction platform from one of the object-specific prediction model, the object group-specific prediction model, and the object-independent prediction model by running computations of the prediction through the object-independent prediction model of the hybrid model instead of the object-specific prediction model and the object group-specific prediction model, and
    wherein the performing performs the prediction based on the hybrid model without requiring history data.

2. The method of claim 1, wherein the determining the prediction result comprises:
    obtaining respective intermediate prediction results of the at least one prediction using testing data that is provided to the hybrid model; and
    determining the prediction result from the intermediate prediction results.

3. The method of claim 2, wherein the determining the prediction result from the intermediate prediction results comprises one of:
    selecting one of the intermediate prediction results as the prediction result; and
    combining two or more of the intermediate prediction results into the prediction result.

4. The method of claim 1, wherein the object-specific prediction model includes a pattern matching model, the object group-specific prediction model includes a deep learning model, and the object-independent prediction model includes a road network-based model.

5. The method of claim 1, wherein the decision rule is based on at least one of:
    a credibility parameter of a respective one of the prediction models representing credibility of the respective prediction model; and
    a route profile of the target object.

6. The method of claim 5, wherein the credibility parameter includes at least one of:
    a history count of a destination or a matching degree of an intermediate prediction result of the object-specific prediction model; and
    a prediction probability of an intermediate prediction result of the object group-specific prediction model; or
    a route efficiency of an intermediate prediction result of the object-independent prediction model.

7. The method of claim 1, further comprising at least one of:
    training the object group-specific prediction model using history route data of an object group; and
    training the decision rule using history route data of at least one of the target object and the object group.

8. The method of claim 1, wherein the determining the prediction result comprises:
    obtaining respective intermediate prediction results of each part of the hybrid model including the object-specific prediction model, the object group-specific prediction model, and the object-independent prediction model using testing data that is provided to the hybrid model;
determining the prediction result from the intermediate prediction results; and
training the decision rule according to intermediate prediction results.

9. A system comprising:
one or more processors;
a memory coupled to at least one of the processors; and
a set of computer program instructions stored in the memory and executed by at least one of the processors in order to perform actions of:
obtaining a first route traversed by a target object;
training an object-specific prediction model using history route data of the target object;
performing at least one prediction for a second route to be traversed by the target object based on a hybrid model jointly applying the first route, the at least one prediction being performed with a hybrid consideration using the hybrid model of gr object-specific prediction model, an object group-specific prediction model, and an object-independent prediction model; and
determining, according to a decision rule, a prediction result of the second route based on the at least one prediction,
wherein the hybrid model completes the prediction when history data is missing or insufficient from a beginning phase of a route prediction platform from one of the object-specific prediction model, the object group-specific prediction model, and the object-independent prediction model by running computations of the prediction through the object-independent prediction model of the hybrid model instead of the object-specific prediction model and the object group-specific prediction model, and
wherein the performing performs the prediction based on the hybrid model without requiring history data.

10. The system of claim 9, wherein the determining the prediction result comprises:
obtaining respective intermediate prediction results of the at least one prediction; and
determining the prediction result from the intermediate prediction results.

11. The system of claim 10, wherein the determining the prediction result from the intermediate prediction results comprises one of:
selecting one of the intermediate prediction results as the prediction result; and
combining two or more of the intermediate prediction results into the prediction result.

12. The system of claim 9, wherein the object-specific prediction model includes a pattern matching model, the object group-specific prediction model includes a deep learning model, and the object-independent prediction model includes a road network-based model.

13. The system of claim 9, wherein the decision rule is based on at least one of:
a credibility parameter of a respective one of the prediction models representing credibility of the respective prediction model; and
a route profile of the target object.

14. The system of claim 13, wherein the credibility parameter includes at least one of:

a history count of a destination or a matching degree of an intermediate prediction result of the object-specific prediction model;
a prediction probability of an intermediate prediction result of the object group-specific prediction model; and
a route efficiency of an intermediate prediction result of the object-independent prediction model.

15. The system of claim 9, wherein the actions further include at least one of:
training the object group-specific prediction model using history route data of an object group; and
training the decision rule using history route data of at least one of the target object or the object group.

16. A computer program product being tangibly stored on a non-transitory machine-readable medium and comprising machine-executable instructions, the instructions, when executed on a device, causing the device to perform actions of:
obtaining a first route traversed by a target object;
training an object-specific prediction model using history route data of the target object;
performing at least one prediction for a second route to be traversed by the target object based on a hybrid model jointly applying the first route, the at least one prediction being performed with a hybrid consideration using the hybrid model of the object-specific prediction model, an object group-specific prediction model, and an object-independent prediction model; and
determining, according to a decision rule, a prediction result of the second route based on the at least one prediction,
wherein the hybrid model completes the prediction when history data is missing or insufficient from a beginning phase of a route prediction platform from one of the object-specific prediction model, the object group-specific prediction model, and the object-independent prediction model by running computations of the prediction through the object-independent prediction model of the hybrid model instead of the object-specific prediction model and the object group-specific prediction model, and
wherein the performing performs the prediction based on the hybrid model without requiring history data.

17. The computer program product of claim 16, wherein the determining the prediction result comprises:
obtaining respective intermediate prediction results of the at least one prediction; and
determining the prediction result from the intermediate prediction results.

18. The computer program product of claim 17, wherein the determining the prediction result from the intermediate prediction results comprises one of:
selecting one of the intermediate prediction results as the prediction result; and
combining two or more of the intermediate prediction results into the prediction result.

19. The computer program product of claim 16, wherein the decision rule is based on each of:
a credibility parameter of a respective one of the prediction models representing credibility of the respective prediction model; and
a route profile of the target object.

20. The computer program product of claim 19, wherein the credibility parameter includes each of:

a history count of a destination or a matching degree of an intermediate prediction result of the object-specific prediction model;
a prediction probability of an intermediate prediction result of the object group-specific prediction model; and
a route efficiency of an intermediate prediction result of the object-independent prediction model.

\* \* \* \* \*